2,883,373

WATER SOLUBLE AZO COLOUR SALTS

Werner Bossard, Riehen, near Basel, and Jacques Voltz and Francois Favre, Basel, Switzerland, assignors to J. R. Geigy A.-G., Basel, Switzerland, a Swiss firm No Drawing. Application January 23, 1956
Serial No. 560,875

Claims priority, application Switzerland January 25, 1955

8 Claims. (Cl. 260—146)

The invention concerns water soluble colour salts which contain an azo dyestuff as cation and processes for the production thereof from azo dyestuffs which are insoluble in water and which contain certain nitrogen-containing hetero rings.

It has been found that stable, water soluble colour salts which contain the azo dyestuff as cation are obtained if an azo dyestuff having no acid dissociating, salt forming groups of the general formula:

$$A\text{—}N\text{=}N\text{—}B$$

wherein A represents a mono or polynuclear hetero ring system with an aromatic hetero ring containing more than one nitrogen atom in the ring, which hetero ring system is bound by one of its carbon atoms to the azo group, and wherein B represents the radical of an azo component which, in the complete dyestuff molecule may be further modified, is reacted at a raised temperature with suitable alkylating agents.

The aromatic hetero ring containing more than one nitrogen atom corresponding to A is, advantageously five membered, i.e. a polyazole ring; it can, however, also be six membered, for example a diazine or a triazine ring. These heterocycles may be further condensed, e.g. they may contain fused benzene or naphthalene rings. Thus A for example can be the radical of a pyrazole, cinnoline, imidazole, triazole, tetrazole, oxidazole, thiadiazole, benzimidazole, naphthimidazole, indazole, pyrimidine, pyridazine, pyrazine, quinazoline, quinoxaline, 1.3.5-triazine or a tetrazine ring. These ring systems can be further substituted within the bounds of the definition by the substituents usual in azo dyestuffs, for example by alkyl, alkoxy, aralkyl, aryl, nitro, acylamino, alkyl sulphonyl, sulphonic acid amide, carboxylic acid ester groups or by halogen. Generally the radical A of the azo dyestuffs usable according to the present invention comes from the diazo component. The radical B which is bound to the azo group represents, chiefly, the radical of an azo coupling component, e.g. the radical of an acylacetylamino arylamide, a hydroxy- or amino-aryl radical of the benzene or naphthalene series, a 5-hydroxy or 5-aminopyrazole radical, a 3-indolyl radical, a 2.4-dihydroxyquinolinyl(3) radical, a 2.4.6-trihydroxy-pyrimidyl(5) radical. The term azo component used in the definition of the invention should not, however, be limited to the actual azo coupling components but should include compounds which are obtained by subsequent modification of the azo dyestuffs produced by azo coupling, such as result for example from the alkylation of p-hydroxy and from the acylation of p-amino azo dyestuffs. Also this term should not have the limited meaning that only dyestuffs obtained by azo coupling should be used. Rather, dyestuffs used according to the present invention can be produced by any method desired. Particularly easily available and therefore preferred are the azo dyestuffs obtained from diazotised heterocyclic amino compounds which contain more than 1 nitrogen atom in the ring. They are produced by coupling with coupling components substituted within the bounds of the definition as desired, which can be further modified either before or during use, for example they can be acylated or alkylated. As coupling components, chiefly isocyclic-aromatic amino and hydroxyl compounds are used, advantageously those coupling in the p-position to the amino and hydroxyl groups, the isocyclic-aromatic ring possibly also containing fused hetero rings such as e.g. in the 4-aminobenztriazole, 4-aminobenzimidazole or the 4-aminoindazole compounds. In the preferred p-aminoarylazo dyestuffs, the amino group can be primary, secondary or tertiary. The substituents of the amino group can be aliphatic, araliphatic, alicyclic, aromatic or heterocyclic. They can be further substituted as in the oxalkyl, fluoralkyl, cyanalkyl, alkoxy, and phenoxy alkyl, the alkylphenyl, alkoxyphenyl, halogen phenyl and alkyl benzyl, halogen benzyl and alkoxy benzyl compounds. Aliphatic substituents of the amino group can form hydrogenated hetero rings either among themselves or together with an ether atom or with the aromatic radical having the amino group, as in the piperidino, the morpholino, the 1.2.3.4-tetrahydroquinoline, the lilolidine, the julolidine, the perimidine compounds. The preferred p-aminophenyl radical of azo dyestuffs usable according to the present invention can be further substituted within the bounds of the definition, e. g. by halogen, alkyl, alkoxy, nitro, acyl-amino, alkyl sulphonyl groups. Monoazo dyestuffs are to be preferred to the polyazo dyestuffs.

Suitable alkylating agents for the production of colour salts according to the present invention are the esters of strong mineral acids and organic sulphonic acids of, preferably, lower alcohols. These are chiefly alkyl chlorides, alkyl bromides, aralkyl halides, dialkyl sulphates and esters of sulphonic acids of the benzene series. For example the methyl, ethyl, propyl, n-butyl esters of benzene sulphonic acid, of p-methyl benzene sulphonic acid, of p-chlorobenzene sulphonic acid and possibly of nitrobenzene sulphonic acids can be used.

The monoazo dyestuffs usable according to the present invention are reacted with the suitable alkylating agents advantageously in inert organic solution, the colour salts often precipitating and being isolated by simple filtration. For example, higher boiling aliphatic, cycloaliphatic or aromatic hydrocarbons can be used as inert organic solvents. Also stable aliphatic or cyclic halogen compounds such as carbon tetrachloride, tetrachlorethylene, mono- or dichlorobenzene, and also nitrobenzene can be used. Also if too energetic reaction conditions are avoided, the reaction can be performed in excess liquid alkylating agents. The reaction of the azo dyestuffs which are insoluble in water with the alkylating agents is exothermic and is generally accompanied by a strong bathochromic alteration in colour. However, generally the components should be heated to introduce the cyclammonium salt formation, particularly when the reaction is performed in the presence of inert organic diluents. Advantageously an excess of alkylating agent is used. Under energetic reaction conditions, primary and secondary amino groups present in the starting material can also be alkylated. However, in choosing the alkylating agent, the cyclammonium salt formation is to be preferred to the alkylation of the primary and secondary amino groups. On the other hand, if there are nitrogen atoms in the ring linked to hydrogen atoms as can occur in triazole, tetrazole and indazole dyestuffs, then often the cyclammonium salt formation only occurs as secondary reaction so that to attain good yields of colour salts, a greater excess of alkylating agents must be used. In some favourable cases the alkylation can be performed in alcoholic solution and even in aqueous dispersion, advantageously in the presence of inert capillary active distributing agents such as fatty alcohol polyglycol ethers. If the reaction is performed in non-polar organic solvents, the colour salts precipitate and can be isolated by filtering off. Due to the good stability of the colour salts according to the present invention, the solvents can also be removed by distilling off, possibly under reduced pressure or by steam distillation. The colour salts according to the present invention can also be obtained from organic solvents which are not miscible with water by extraction with water. The colour salts according to the present invention are purified advantageously by dissolving in water, any undissolved starting material present not going into solution, oily impurities are removed with animal charcoal and the colour salt can be isolated by salting out, possibly in the presence of acid hydrogen halide salts of metals of the second sub-group of the periodic system of the elements such as zinc chloride.

Some of the dyestuffs usable according to the present invention are known, others can easily be produced by methods known per se, for example from primary aromatic-heterocyclic amines having more than one nitrogen atom in the ring by diazotisation and coupling with azo components substituted as desired within the bounds of the definition, or by alkaline condensation with nitroso aryl compounds.

The colour salts according to the present invention correspond to the general formula:

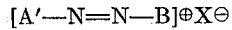

$$[A'—N=N—B]^{\oplus} X^{\ominus}$$

In this formula, A′ represents an aromatic mono- or polynuclear N-alkyl cycloammonium ring system, the hetero ring of which contains more than one nitrogen atom in the ring and which is bound to the azo group by a carbon atom of the hetero ring, B represents the radical of any azo component desired including the radical of coupling components which are further modified after the azo coupling, and $X^{\ominus}$ represents the anion equivalent to the cation, whereby the coloured cation should not contain any acid dissociating, salt forming groups such as e. g. sulphonic acid or carboxyl groups. Advantageously A′ represents an N-alkylazolium ring with more than one N atom in the ring and B represents a p-hydroxy and, in particular, a p-aminoaryl radical, wherein the amino group can be primary, secondary or tertiary. The N-alkyl group of the cyclammonium ring can be further substituted, e.g. by phenyl in aralkyl substituents or by the hydroxyl group in oxalkyl substituents. The anion $X^{\ominus}$ is generally derived from a strong inorganic acid or from an organic sulphonic acid or an organic derivative of sulphuric acid, e.g. from halogen hydracids, sulphuric acid, sulphuric acid half esters or aryl sulphonic acids. Chlorine ion, bromine ion, iodine ion, methosulphate ion, ethosulphate ion, sulphate ion, bisulphate ion, benzene sulphate ion, p-methylbenzene sulphate ion, p-chlorobenzene sulphate ion are the anions $X^{\ominus}$ most generally used. However, the strongly basic coloured cations form stable salts with the weaker acids. Thus radicals of organic acids can also be used as $X^{\ominus}$, such as e.g. the anion of acetic acid, formic acid, oxalic acid, lactic acid, tartaric acid; even some of the bases themselves are stable so that $X^{\ominus}$ can be the hydroxyl ion. Often the double salts of the colour salts according to the present invention can be produced with certain inorganic salts, and used, in particular the zinc chloride double salts. Thus also more complex anions can be used as the anion $X^{\ominus}$ equivalent to the coloured cation, such as chlorozincate or a chlorocadmiate ion.

As can be seen, the uncoloured anion plays a secondary part. The dyestuff character is determined by the coloured cation. The colour salts according to the present invention can be termed basic dyestuffs. It is favourable for the water solubility of these colour salts however, if $X^{\ominus}$ represents one of the anions of stronger acids first listed above. Compounds which are less well soluble in water can generally easily be dissolved with the addition of acids.

In aqueous solution, the colour salts according to the present invention dye cellulose fibres mordanted with tartar emetic and tannin, silk, leather and polymeric synthetic fibres containing nitrogen consisting of polyacrylonitrile, or made chiefly from acrylonitrile, generally in very pure shades. The dyeings produced with the dyestuffs according to the present invention are often distinguished by very good fastness to light.

As in aromatic hetero rings containing more than one nitrogen atom in the ring it could not be determined which of these nitrogen atoms is quaternised on alkylation, these favourable properties of the colour salts according to the present invention were not immediately obvious.

The following examples serve to illustrate the invention. Where not otherwise stated, the parts are given as parts by weight and the temperatures are in degrees centigrade. The relationship of parts by weight to parts by volume is as that of kilogrammes to litres.

EXAMPLE 1

2.4 parts of 3-amino-1.2.4-triazole are dissolved at 0° in 100 parts of glacial acetic acid and 30 parts of concentrated hydrochloric acid, diazotised with 100 parts by volume of N-nitrite solution and the diazo compound is coupled with 15 parts of N.N-diethylaminobenzene in 200 parts of diluted sulphuric acid.

On completion of the coupling, the reaction solution is poured while stirring well into 2500 parts of ice water and after stirring for one hour, the orange-yellow dyestuff which precipitates is filtered off under suction.

24 parts of the dyestuff so obtained and 0.4 part of magnesium oxide are pasted in 170 parts of chlorobenzene and the suspension is boiled. While stirring strongly, 5 parts of dimethyl sulphate in 25 parts of chlorobenzene are added dropwise within 30 minutes whereupon the colour changes towards red. The reaction solution is boiled under reflux for another hour and after cooling to 0°, is filtered. To further purify the precipitated red dyestuff, it is dissolved in 200 parts of water and precipitated with sodium chloride from the solution which has been somewhat clarified with charcoal. The dyestuff dissolves in concentrated sulphuric acid with a yellow and in water with a red colour. It dyes mordanted cotton, silk, leather and polyacrylonitrile fibres from an acetic acid bath in vivid red shades which have excellent general fastness properties. Products with similar properties are obtained if in the above example the compounds listed in the following Table 1a are used as coupling components and the amounts given are used on alkylation and otherwise the same procedure is followed.

*Table 1a*

| Coupling component | dyestuff, parts | solvent, parts | alkylating agent | acid binding agent | solution colour in $H_2O$ | dyeing on polyacrylonitrile fibres |
|---|---|---|---|---|---|---|
| N.N-dimethylaminobenzene | 2.4 | 195 | 5 Pts. dimethyl sulphate | 0.4 Pt. magnesium oxide | red | red. |
| N.N-dihydroxyethylaminobenzene | 2.8 | 195 | 9.4 Pts. p-toluene sulphonic acid methyl ester. | do | do | Do. |
| N-ethyl-N-benzylaminobenzene | 3.1 | 195 | 5.4 Pts. butyliodide | 1 Pt. calcium carbonate | do | Do. |
| N.N-dibenzylaminobenzene | 3.7 | 200 | 5 Pts. dimethyl sulphate | do | do | Do. |
| 1-N.N-dimethylamino-3-methylbenzene | 6.9 | 300 | 12.6 Pts. dimethyl sulphate | 1.2 Pts. magnesium oxide | do | Do. |
| 1-N.N-dimethylamino-3-methoxy benzene | 4.9 | 250 | 10.8 Pts. diethyl sulphate | 2 Pts. calcium carbonate | yellowish red. | yellowish red. |
| 1-N.N-dimethylamino-3-chlorobenzene | 10 | 350 | 16.8 Pts. dimethyl sulphate | 1.6 Pts. magnesium oxide | red | red. |
| phenol | 1.9 | 195 | 6.3 Pts. dimethyl sulphate | 2 Pts. calcium carbonate | orange | yellow. |
| α-naphthol | 4.6 | 250 | 19 Pts. toluene sulphonic acid methyl ester. | 0.8 Pt. magnesium oxide | do | orange. |
| β-naphthol | 4.6 | 250 | 10.8 Pts. diethyl sulphate | do | do | Do. |

All the products in the above table dissolve in concentrated sulphuric acid with a yellow colour.

Water soluble dyestuffs with similar properties are obtained if the equivalent amount of 5-methyl-3-amino-1.2.4-triazole (Table 1b) or analogous homologues such as e.g. 5-ethyl-3-amino-1.2.4-triazole are used.

*Table 1b*

| Coupling component | dyestuff, parts | solvent, parts | alkylating agent | acid binding agent | solution colour in $H_2O$ | dyeing on polyacrylonitrile fibres |
|---|---|---|---|---|---|---|
| N.N-dimethylaminobenzene | 6.9 | 350 | 12.6 Pts. dimethyl sulphate | 1.2 Pts. magnesium oxide | red | red. |
| N.N-diethylaminobenzene | 7.7 | 350 | do | 3 Pts. calcium carbonate | do | Do. |
| N-ethyl-N-benzylaminobenzene | 3.3 | 200 | 9.4 Pts. p-toluene sulphonic acid methyl ester. | 0.4 Pt magnesium oxide | do | Do. |
| 1-N.N-dimethylamino-3-methylbenzene | 7.3 | 350 | 12.6 Pts. dimethyl sulphate | 1.2 Pts. magnesium oxide | do | Do. |
| phenol | 1.1 | 180 | 9.4 Pts. p-toluene sulphonic acid methyl ester. | 1 Pt. calcium carbonate | orange | yellow. |
| phenyl morpholine | 2.7 | 200 | 5 Pts. diethyl sulphate | 0.4 Pt. magnesium oxide | red | red. |
| N-methylaminobenzene | 2.2 | 200 | 5 Pts. diethyl sulphate | 1 Pt. calcium carbonate | orange | orange. |
| 1-phenyl-3-methyl-5-aminopyrazole | 2.8 | 200 | 7.2 Pts. diethyl sulphate | do | yellow | yellow. |

All the products in the above table dissolve in concentrated sulphuric acid with a yellow colour.

acid with a yellow colour. It dyes polyacrylonitrile fibres, mordanted cotton and silk in pure red shades.

Also N.N-diethylaminobenzene or N.N-dibenzylaminobenzene can be used instead of N-ethyl-N-benzylaminobenzene and keeping to the same conditions and using the amounts of substances given in Table 2, similar colour salts are obtained which dye polyacrylonitrile fibres in red shades.

*Table 2*

| Coupling component | dyestuff, parts | solvent, parts | alkylating agent | acid binding agent | dyeing on polyacrylonitrile fibres |
|---|---|---|---|---|---|
| N.N-diethylaminobenzene | 2.5 | 290 | 5 Pts. dimethyl sulphate | 1 Pt. calcium carbonate | red. |
| N-ethyl-N-benzylaminobenzene | 3.0 | 290 | do | 0.4 Pt. magnesium oxide | Do. |
| N.N-dibenzylaminobenzene | 3.7 | 290 | 11.7 Pts p-toluene sulphonic acid methyl ester. | 0.8 Pt magnesium oxide | Do. |

EXAMPLE 2

A solution of 8.5 parts of 5-aminotetrazole in 100 parts of water and 40 parts of concentrated hydrochloric acid is diazotised at 0° with the addition of ice with 100 parts by volume of N-nitrite solution. The diazotisation is performed quickly and the diazo compound is immediately coupled with 21.1 parts of N-ethyl-N-benzylaminobenzene in 200 parts of diluted sulphuric acid. An orange red dyestuff is so obtained.

3 parts of this azo dyestuff dried in the vacuum are dissolved in 220 parts of chloroform and 0.4 part of magnesium oxide are added to the solution. 5 parts of dimethyl sulphate in 70 parts of chloroform are then added to the boiling solution within 5 minutes and the whole is boiled for a further two hours. The colour changes towards red. The reaction solution is evaporated in the vacuum to dryness, and the residue is taken up in 200 parts of water. 10% sodium chloride is added to the solution so obtained whereupon the dyestuff precipitates in fine crystals. The colour salt so obtained is dried in the vacuum; it dissolves in water with a red and in sulphuric The products obtained according to Table 2 all dissolve in water with a red and in concentrated sulphuric acid with a yellow colour.

EXAMPLE 3

A solution of 6.7 parts of 2-aminobenzimidazole in 300 parts of abs. toluene are boiled under reflux in a nitrogen atmosphere with 2 parts of finely pulverised sodium amide for 30 minutes. 7.5 parts of freshly prepared 1-N.N-diethylamino-4-nitrosobenzene are added to the suspension of the sodium salt of 2-aminobenzimidazole so obtained and the reaction solution is boiled under reflux for another 3 hours (see Brown, J.A.C.S. 73, 4608 (1951)). The reaction mixture is evaporated to dryness in the vacuum and extracted warm with 25% acetic acid. While cooling the acetic acid extract is carefully neutralised with concentrated caustic soda lye and the dyestuff which precipitates is filtered off.

A solution of 2.92 parts of this dyestuff in 100 parts of tetrachlorethane is reacted at boiling temperature for 1 hour with 3.9 parts of dimethyl sulphate in 10 parts of chlorobenzene. The dyestuff which precipitates on cooling is then filtered off.

The violet dyestuff obtained is dissolved in 200 parts of insofar as the amounts of substances given in Table 4a are used and the same procedure as described in the above example is followed.

*Table 4a*

| Coupling component | dyestuff, parts | solvent, parts | alkylating agent | acid binding agent | solution colour in H₂O | dyeing on polyacrylonitrile fibres |
|---|---|---|---|---|---|---|
| N-ethyl-N-benzylamino-benzene | 3.5 | 190 | 3 Pts. dimethyl sulphate | 0.4 Pt magnesium oxide | Red-blue | Red-blue. |
| 1-N.N-diethylamino-3-methyl-benzene | 2.1 | 160 | 3.7 Pts. butyl iodide | 1.0 Pt. calcium carbonate | Violet | Violet. |
| 1-N.N-diethylamino-2-methoxy-5-methyl-benzene | 3.4 | 200 | 3 Pts. dimethyl sulphate | 0.4 Pt. magnesium oxide | do | Do. |
| Phenol | 2.4 | 180 | do | 0.8 Pt. magnesium sulphate | red-orange | yellow. |
| 1-amino-3-methyl-benzene | 2.5 | 200 | 2.2 Pts. toluene sulphonic acid methyl ester | 0.4 Pt. magnesium oxide | Ruby | Ruby. | hot water and precipitated with 1.5 parts of zinc chloride and sodium chloride from the solution which has been clarified with a little charcoal. The dyestuff dissolves in concentrated sulphuric acid with a yellow and in water with a violet colour. Mordanted cotton, silk, leather and polyacrylonitrile fibres are dyed in violet shades from an All the products obtained according to the above table dissolve in concentrated sulphuric acid with a violet colour but change in a few minutes to orange yellow.

Instead of 3-amino indazole, also 4-methyl-3-amino indazole (Table 4b), 4-methoxy- or 4-chloro-3-amino indazole can be used as diazo components.

*Table 4b*

| Coupling component | dyestuff, parts | solvent, parts | alkylating agent | acid binding agent | solution colour in H₂O | dyeing on polyacrylonitrile fibres |
|---|---|---|---|---|---|---|
| 1-N.N-diethylamino-3-carbethoxybenzene | 3.8 | 200 | 1.6 Pts. diethyl sulphate | 0.4 Pt. magnesium oxide | violet | red-blue. |
| 1-amino-3-methylbenzene | 2.7 | 150 | 2.2 Pts. p-toluene sulphonic acid methyl ester | do | ruby | ruby. | acetic acid bath. The dyeings have very good general fastness properties.

Some azo components are given in the following table which on condensing according to the method of the above example with 2-aminobenzimidazole, produce dyestuffs which, on using the amounts of substances given in Table 3 under the conditions of the above example, produce colour salts which have the same good properties.

The products obtained according to the above table all dissolve in concentrated sulphuric acid with a violet colour but change after a few minutes to orange-yellow.

EXAMPLE 5

5.7 parts of 2-amino-5-methyl-1.3.4-thiadiazole in 100 parts of sulphuric acid 40° Bé. are quickly diazotised at —10° with a solution of 3.5 parts of sodium nitrite in

*Table 3*

| Nitroso component | dyestuff, pars | solvent, parts | alkylating agent | acid binding agent | dyeing on polyacrylonitrile fibres |
|---|---|---|---|---|---|
| 1-N.N-diethylamino-4-nitrosobenzene | 3.06 | 195 | 3 Pts. dimethyl sulphate | 0.4 Pt. magnesium oxide | violet. |
| 1-N-ethyl-N-benzylamino-4-nitrosobenzene | 3.54 | 195 | 3.4 Pts. benzyl bromide | 1.0 pt. calcium carbonate | Do. |

The products obtained according to the above table all dissolve in water with a violet colour and in concentrated sulphuric acid with a yellow colour.

EXAMPLE 4

13.3 parts of 3-amino indazole in 100 parts of water and 50 parts of concentrated hydrochloric acid are diazotised with 6.9 parts of sodium nitrite at 0–5° and, in acid solution, coupled with 18.0 parts of N.N-diethylaminobenzene.

3.07 parts of the orange brown, well dried dyestuff are ethylated as described in Example 3 with 4.5 parts of diethyl sulphate. In this way a colour salt is obtained which dissolves in water with a red blue colour and which dyes polyacrylonitrile fibres, mordanted cotton, silk and leather red blue from an acetic acid bath.

The dyestuff dissolves in concentrated sulphuric acid with a violet colour but it quickly changes to orange.

The following table contains further azo components which, coupled with diazotised 3-amino indazole, also produce colour salts which have the same good properties 35 parts of water. 9 parts of diphenyl-N-methylamine in 10 parts of acetic acid are added to this diazo solution, the whole is stirred for 15 minutes at —5°, poured into 250 parts of ice water and the acid reaction is buffered with diluted caustic soda lye. The dyestuff which precipitates is filtered off, washed and dried.

A solution of 3.1 parts of this dyestuff in 200 parts of chloroform is heated for 3 hours at 110° under pressure with 4 parts of ethyl bromide. The reaction mixture is evaporated and the residue is dissolved in 200 parts of hot water and precipitated from the solution which has been clarified with a little charcoal with potassium bromide. The colour salt dissolves in water with a violet and in concentrated sulphuric acid with a yellow colour. It dyes polyacrylonitrile fibres, mordanted cotton, silk and leather from an acetic acid bath in vivid violet shades which have good general fastness properties.

Products with similar properties are obtained using the coupling components listed in the following Table 5 and keeping to the above conditions.

Table 5

| Coupling component | dyestuff, parts | solvent, parts | alkylating agent | solution colour in H₂O | dyeing on polyacrylonitrile fibres |
|---|---|---|---|---|---|
| N.N-dimethylaminobenzene | 2.5 | 200 | 2.6 Pts. dimethylsulphate | violet | violet. |
| N-ethyl-N-benzylaminobenzene | 3.4 | 200 | 4 Pts. p-toluene sulphonic acid methyl ester | do | Do. |
| N-methyl-N-β-cyanethylaminobenzene | 2.9 | 200 | 2.6 Pts. dimethyl sulphate | do | Do. |
| 1-amino-3-methylbenzene | 2.3 | 200 | 3.1 Pts. diethyl sulphate | red-violet | red-violet. |
| 1-N.N-dimethylamino-2.5-dimethoxybenzene | 2.8 | 200 | 2.6 Pts. dimethyl sulphate | ruby | Do. |
| 1.2.3.4-tetrahydroquinoline | 2.6 | 200 | 4 Pts. p-toluene sulphonic acid methyl ester | violet | violet. |

All the products obtained according to the above table dissolve in concentrated sulphuric acid with a yellow colour.

Similar products are also obtained if instead of 2-amino-5-methyl-1.3.4-thiadiazole, the equivalent amounts of 2-amino-1.3.4-thiadiazole or 2-amino-5-phenyl-1.3.4-thiadiazole are used as diazo components.

The analogous 1.3.4-oxidazolyl-(2)-azo dyestuffs produce considerably more red shades on polyacrylonitrile fibres.

EXAMPLE 6

12 parts of 2-amino-4.6-bis-diethylamino-s-triazine are condensed under the conditions given in Example 3 with 7.5 parts of 1-N.N-dimethylamino-4-nitrosobenzene in the presence of 2 parts of sodium amide in 350 parts of toluene. The reaction mixture is evaporated to dryness and extracted warm with 25% acetic acid. The azo dyestuff forms the extraction residue and is recrystallised from acetone.

2.8 parts of the azo dyestuff so obtained are methylated at 120° with 1.5 parts of diethyl sulphate in xylene and the reaction product is worked up as described in Example 3. In this way a yellow, easily water-soluble colour salt is obtained which dissolves in concentrated sulphuric acid with an orange colour. From an acetic acid bath it dyes polyacrylonitrile fibres and silk in yellow shades. Products with similar properties are obtained also if instead of 1-N.N-dimethylamino-4-nitrosobenzene, 8.7 parts of 1-N.N-diethylamino-4-nitrosobenzene or 12 parts of 1-(N-ethyl-N-benzylamino)-4-nitrosobenzene are used. Related colour salts are obtained if the amines listed in Table 6 are used as starting materials instead of 2-amino-4.6-bis-diethylamino-s-triazine.

are added within 10 minutes to the boiling solution and the whole is boiled for another 30 minutes. The colour changes towards yellow. The reaction solution is evaporated to dryness in the vacuum and the residue is taken up in 200 parts of acidified water. 10% sodium chloride is added to the solution obtained whereupon the dyestuff precipitates in the form of fine crystals. The colour salt so obtained is dried in the vacuum; it dissolves in water with a yellow and in sulphuric acid with a yellow brown colour. It dyes polyacrylonitrile fibres, silk, mordanted cotton and leather in yellow shades.

Dyestuffs with similar properties are obtained if, instead of 1-phenyl-3-methyl-5-amino-pyrazole, 1-phenyl-3-methyl-5-pyrazolone, indole or pyrrole are used for the coupling.

What we claim is:
1. A dyestuff of the formula

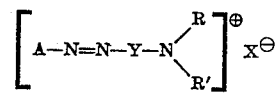

the cation part of which is free from acid salt-forming groups and wherein A represents a radical selected from the group consisting of an N-lower alkyl cyclammonium ring system and an N-benzyl cyclammonium ring system, each comprising a single hetero nucleus of five ring members of which at least two are ring N-atoms, said radical being bound to the azo group by a C-atom that forms part of said hetero nucleus, Y represents a p-phenylene radical, R and R' are members selected from the group consisting of hydrogen, lower aliphatic, benzyl Table 6

| Starting base | Nitroso compound | dyestuff, parts | solvent, parts | alkylating agent | solution colour in H₂SO₄ conc. | dyeing on polyacrylonitrile fibres |
|---|---|---|---|---|---|---|
| 1-β-phenylethyl-3-amino-s-triazine | 1-N.N-dimethylamino-4-nitrosobenzene | 1.7 | 100 | 0.6 Pt. dimethyl sulphate | orange | yellow. |
| 2-amino-1.3-pyrimidine | do | 2.3 | 150 | 2.2 Pts. p-toluene sulphonic acid methyl ester | yellow-orange | Do. |
| 2-amino-4-methyl-1.3-pyrimidine | do | 2.4 | 150 | 0.6 Pt. dimethyl sulphate | yellow | Do. |
| Do | 1-N.N-diethylamino-4-nitrosobenzene | 2.9 | 150 | do | do | Do. |

All the products obtained according to the above table dissolve in water with a yellow colour.

EXAMPLE 7

An acid solution of 8.5 parts of 5-aminotetrazole in 100 parts of water is diazotised as described in Example 2 and coupled with 16.0 parts of 1-phenyl-3-methyl-5-aminopyrazole in 200 parts of diluted sulphuric acid. An orange-red dyestuff is thus obtained.

2.9 parts of this azo dyestuff which has been dried in the vacuum are dissolved in 220 parts of chloroform and 1.2 parts of magnesium oxide are added to the solution. 7 parts of dimethyl sulphate in 10 parts of chloroform and phenyl radicals and radicals wherein R and R' are combined and together with the amino nitrogen atom form a heterocyclic ring, and X⊖ represents an anion.

2. A dyestuff of the formula:

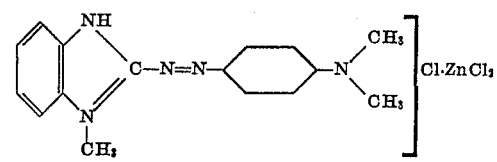

3. A dyestuff of the formula:

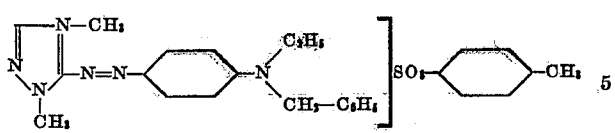

4. A dyestuff of the formula:

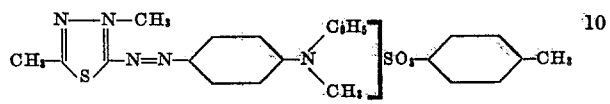

5. A dyestuff of the formula:

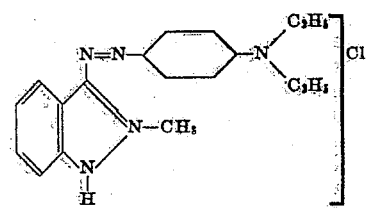

6. A dyestuff of the formula:

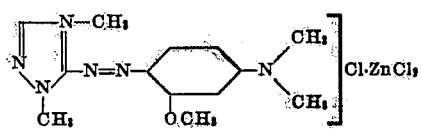

7. The dyestuff of the formula:

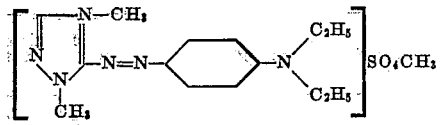

8. A dyestuff of the formula

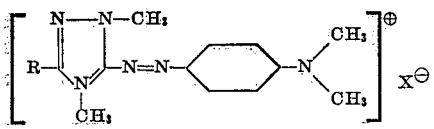

wherein R represents a member selected from the group consisting of hydrogen and methyl and X is an anion.

References Cited in the file of this patent

UNITED STATES PATENTS

| | | |
|---|---|---|
| 2,135,293 | Renshaw et al. | Nov. 1, 1938 |
| 2,432,419 | Heimbach | Dec. 9, 1947 |
| 2,569,418 | Kellog | Sept. 25, 1951 |
| 2,675,375 | Marson et al. | Apr. 13, 1954 |
| 2,744,105 | Barney | May 1, 1956 |
| 2,768,158 | Strobel et al. | Oct. 23, 1956 |

FOREIGN PATENTS

| | | |
|---|---|---|
| 136,921 | Switzerland | Feb. 17, 1930 |

OTHER REFERENCES

Saunders: The Aromatic Diazo Compounds (2nd ed.), 1949, pp. 78–9.